United States Patent
Botti et al.

(10) Patent No.: US 10,635,794 B2
(45) Date of Patent: *Apr. 28, 2020

(54) DETERMINE SECURITY ACCESS LEVEL BASED ON USER BEHAVIOR

(71) Applicant: INTERNATIONAL BUSINESS MACHINES CORPORATION, Armonk, NY (US)

(72) Inventors: Derek W. Botti, Holly Springs, NC (US); Ramamohan Chennamsetty, Hopewell Junction, NY (US); C. Steven Lingafelt, Durham, NC (US); William H. Tworek, Hopkinton, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,215

(22) Filed: Nov. 13, 2017

(65) Prior Publication Data

US 2018/0068099 A1   Mar. 8, 2018

Related U.S. Application Data

(63) Continuation of application No. 14/970,867, filed on Dec. 16, 2015, now Pat. No. 9,870,454.

(51) Int. Cl.
*G06F 21/31* (2013.01)
*G06F 21/62* (2013.01)
(Continued)

(52) U.S. Cl.
CPC .......... *G06F 21/316* (2013.01); *G06F 21/554* (2013.01); *G06F 21/62* (2013.01);
(Continued)

(58) Field of Classification Search
CPC ...... G06F 21/316; G06F 21/554; G06F 21/62; G06F 2221/2113; G06F 2221/2101;
(Continued)

(56) References Cited

U.S. PATENT DOCUMENTS 5,727,129 A    3/1998  Barrett et al.
6,591,265 B1   7/2003  Erickson et al.
(Continued)

OTHER PUBLICATIONS

List of IBM Patents or Patent Applications Treated As Related; YOR920151109US02, Date Filed Nov. 13, 2017, p. 1-2.

*Primary Examiner* — Cheng-Feng Huang
(74) *Attorney, Agent, or Firm* — Cantor Colburn LLP; Kurt Goudy

(57) ABSTRACT

Examples of techniques for determining security access based on user behavioral measurements are disclosed. In accordance with aspects of the present disclosure, a computer-implemented method is provided. The method may comprise performing a trust evaluation to calculate a trust penalty value for a user based on a plurality of measured user attributes. The method may further comprise determining, by a processing device, a security access level based on a predefined trust threshold and the trust penalty value for the user. The method may also comprise applying the security access level to the user.

7 Claims, 5 Drawing Sheets

(51) Int. Cl.
*G06F 21/55* (2013.01)
*H04L 29/08* (2006.01)
*H04L 29/06* (2006.01)
*H04L 9/32* (2006.01)

(52) U.S. Cl.
CPC ......... *H04L 63/105* (2013.01); *H04L 67/303* (2013.01); *G06F 2221/034* (2013.01); *G06F 2221/2101* (2013.01); *G06F 2221/2113* (2013.01); *G06F 2221/2141* (2013.01); *H04L 9/32* (2013.01)

(58) Field of Classification Search
CPC ....... G06F 2221/2141; G06F 2221/034; H04L 63/105; H04L 67/303; H04L 9/32
See application file for complete search history.

(56) References Cited

U.S. PATENT DOCUMENTS

| | | | |
|---|---|---|---|
| 8,224,755 B2 | 7/2012 | Goodman et al. | |
| 8,396,890 B2 | 3/2013 | Lim | |
| 8,776,168 B1* | 7/2014 | Gibson | H04L 63/104 709/225 |
| 8,776,180 B2 | 7/2014 | Kumar et al. | |
| 8,793,790 B2 | 7/2014 | Khurana et al. | |
| 9,069,976 B2 | 6/2015 | Toole et al. | |
| 9,286,482 B1* | 3/2016 | Dumont | G06F 21/32 |
| 9,325,715 B1* | 4/2016 | Chereshnev | H04L 63/1433 |
| 2005/0256956 A1 | 11/2005 | Littlefield et al. | |
| 2008/0288330 A1 | 11/2008 | Hiledbrand et al. | |
| 2011/0314559 A1* | 12/2011 | Jakobsson | G06F 21/36 726/28 |
| 2012/0054847 A1* | 3/2012 | Schultz | G06F 21/33 726/9 |
| 2013/0024238 A1* | 1/2013 | Nielson | G06Q 40/06 705/7.28 |
| 2013/0227712 A1 | 8/2013 | Salem et al. | |
| 2013/0298186 A1 | 11/2013 | Radkowski et al. | |
| 2014/0189098 A1* | 7/2014 | MaGill | H04L 63/1425 709/224 |
| 2015/0106888 A1 | 4/2015 | Cheng et al. | |
| 2015/0281239 A1* | 10/2015 | Brophy | H04L 63/10 726/4 |
| 2015/0324563 A1 | 11/2015 | Deutschmann et al. | |
| 2016/0021117 A1* | 1/2016 | Harmon | H04L 63/105 726/1 |
| 2016/0321652 A1 | 11/2016 | Dimmick et al. | |
| 2017/0177845 A1 | 6/2017 | Botti et al. | |

\* cited by examiner

DETERMINE SECURITY ACCESS LEVEL BASED ON USER BEHAVIOR

DOMESTIC PRIORITY

This application is a continuation of U.S. patent application Ser. No. 14/970,867, entitled "DETERMINE SECURITY ACCESS LEVEL BASED ON USER BEHAVIOR," filed Dec. 16, 2015, the disclosure of which is incorporated by reference herein in its entirety.

BACKGROUND

The present disclosure relates generally to security access and, more particularly, relates to determining security access based on user behavioral measurements.

Current application and/or information security access control systems are static and do not represent the new paradigm of dynamic users and how users evolve in their use of and access to applications. For example, current security access control systems often rely on manual inputs, such as by a security administrator, to modify a user's security access level. In other examples, automated changes to a user's security access level may be based on events, such as time (e.g., how long a user has been employed), changes in job functions (e.g., the user needs additional security access based on a new job function), and other information within an enterprise. However, none of these techniques utilize information external to the enterprise to modify the user's security access level.

SUMMARY

In accordance with aspects of the present disclosure, a computer-implemented method is provided. The method may comprise performing a trust evaluation to calculate a trust penalty value for a user based on a plurality of measured user attributes. The method may further comprise determining, by a processing device, a security access level based on a predefined trust threshold and the trust penalty value for the user. The method may also comprise applying the security access level to the user.

In accordance with additional aspects of the present disclosure, a system is provided. The system may comprise a processor in communication with one or more types of memory. The processor may be configured to perform a trust evaluation to calculate a trust penalty value for a user based on a plurality of measured user attributes. The processor may be further configured to determine a security access level based on a predefined trust threshold and the trust penalty value for the user. The processor may also be configured to apply the security access level to the user.

In accordance with yet additional aspects of the present disclosure, a computer program product is provided. The computer program product may comprise a non-transitory storage medium readable by a processing circuit and storing instructions for execution by the processing circuit for performing. The method may comprise performing a trust evaluation to calculate a trust penalty value for a user based on a plurality of measured user attributes. The method may further comprise determining a security access level based on a predefined trust threshold and the trust penalty value for the user. The method may also comprise applying the security access level to the user.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of determining a user's security access level based on the user's behavior. For example, a user in an enterprise environment may have a certain security access level, enabling the user to perform certain actions. The past behavior of the user in the enterprise environment may support the current security access. However, a change in the user's behavior outside of the enterprise environment may indicate that a change in the user's security access level may be appropriate. The change in the user's behavior may indicate an increased risk for the enterprise. For example, a change in the user's personal life (e.g., a divorce, financial difficulty, criminal activity, etc.) and/or a change in the user's behavior patterns (e.g., logging into the enterprise at odd times, accessing systems arbitrarily, non-compliance issues, accessing illegal/inappropriate materials, etc.) may indicate that a change in the user's security access level may be appropriate. Additionally, a user's continued positive behavior may indicate that the user's current security access level is appropriate and/or should be increased.

In some implementations, the present techniques take into account user behavior from across the user's internet interactions and use it to drive changes in the access control systems. The present disclosure provides a repeatable technique that can be used to implement autonomic adjustments to user's security access level based on deterministic inputs (e.g., inputs based on the user's behavior, inputs relating to the user, etc.). These and other advantages will be apparent from the description that follows.

Figure 1:
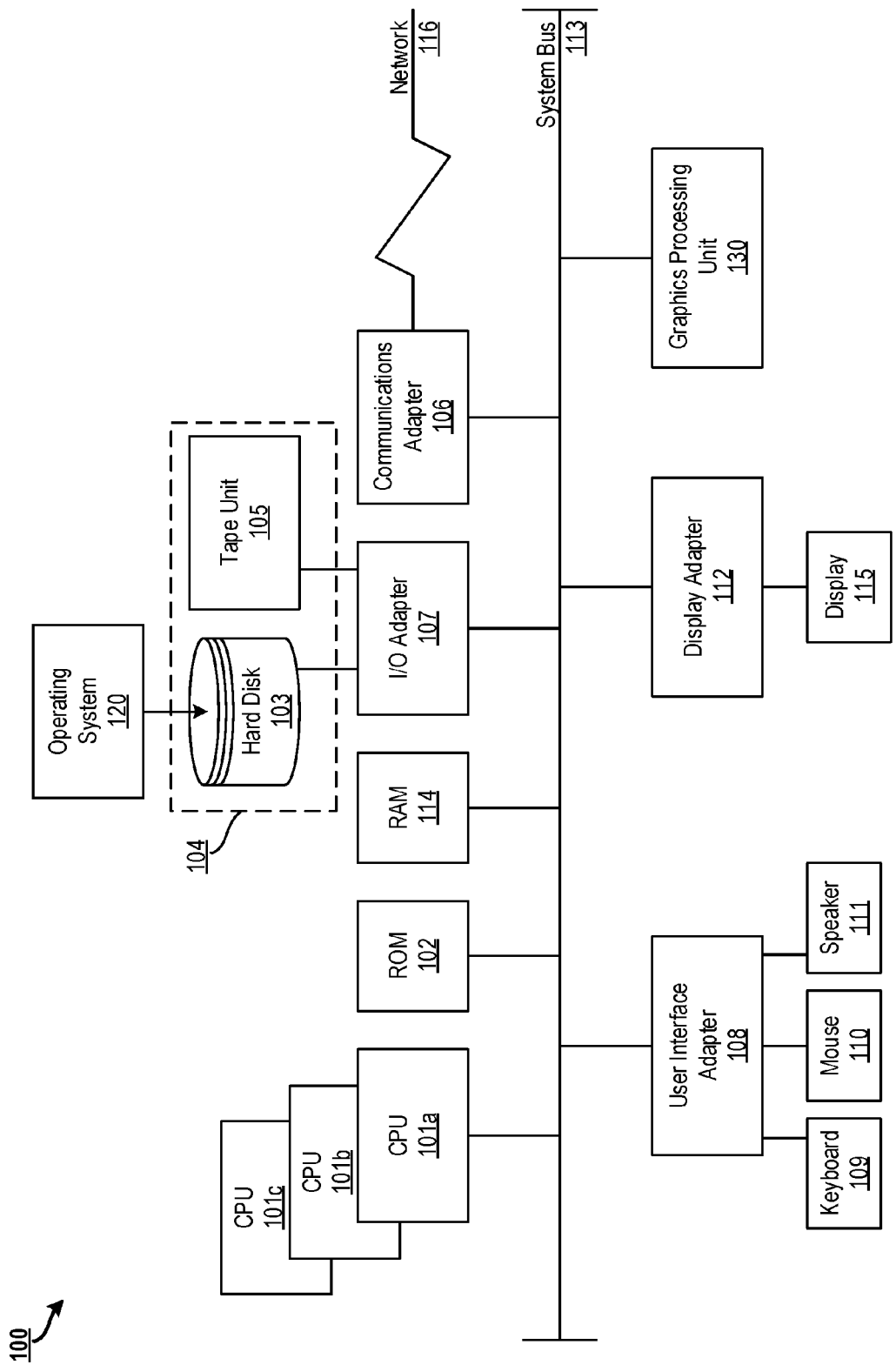
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
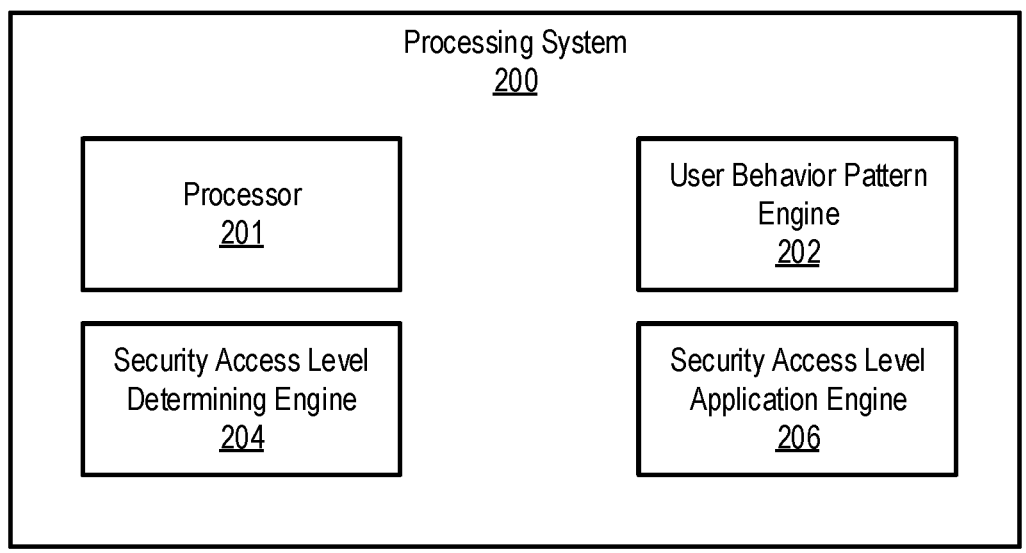
FIG. 2 illustrates a block diagram of a processing system for determining a user's security access level based on the user's behavior according to examples of the present disclosure.

FIG. 2 illustrates a block diagram of a computing system for determining a user's security access level based on the user's behavior according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 200 may include a processor 201, a user behavior pattern engine 202, a security access level determining engine 204, and a security access level application engine 206. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

User behavior pattern engine 202 performs a trust evaluation to calculate a trust penalty value for a user based on a plurality of measured user attributes. The trust penalty value is a quantification of the "poor" behavior of the user which may adversely impact the risk or security of the enterprise. In examples, the plurality of measured user attributes is based on observing the behavior of the user. For example, the user's social behavior may be observed, including where the user goes, when the user is active, where and when the user travels, the user's social media interactions, etc.

In additional examples, the plurality of measured user attributes may be based on observing a life event of the user, including whether the user is recently married or divorced, whether the user had a new child, whether the user is a new employee, is on probation, or is close to retirement, whether the user's credit score changed, and whether the user has engaged in any known criminal activity. In further examples, the plurality of measured attributes may be based on observing a connection attribute of the user, including how many times the user accessed the enterprise from a restricted network, how many times the user connected to the enterprise with an untrusted device, the distribution of when the user normally connects and where the user normally connects from, a number of simultaneous connections from different devices of the user, and whether the user connects with a new device. In examples, the plurality of measured user attributes may be based on observing a connection attribute of the user's processing system (e.g., personal computer, smart phone, etc.), including the user's processing system's remote connection software version. An example of a connection attribute for a user is that the user connects to a server within the enterprise at 10 pm from a specific location, while an example of a connection attribute of the user's processing system is that a virtual private network tunnel established by the processing system is running an out of date version. Additionally, the plurality of measured attributes may be based on observing a compliance issue, such as prior failed audits of the user's device or the user's device contains a virus or malicious code.

In examples, the plurality of measured user attributes is based on observing a work activity of the user, including the type of data the user is accessing, the quantity of data downloaded by the user, the time the user remains active/connected, the distribution of intensity of user activity, the actions that the user takes that are outside of the user's job function, and the type of network traffic generated by the user. Additional behaviors may also be observed, such as environmental measurements including recent motion or speed, pressure or force of key presses or screen clicks, temperature and/or heartrate measured in wearable devices or remotely determined. Other suitable attributes, as well as appropriate combinations of the forging, may also be observed.

Another behavior may include a compliance violation of the user (e.g., did the user attempt to access information on the enterprise that the user should not have tried to access, did the user download a large amount of data from the enterprise, etc.). Another behavior may include observing the user's work activity pattern (e.g., did the user begin logging in at odd/off hours, did the user attempt to download a large amount of data from the enterprise, etc.). These and other behaviors may be observed.

User behavior pattern engine 202 calculates the trust penalty value for each of these attributes. Once each of the trust penalty values for each of the attributes are calculated, user behavior pattern engine 202 calculates an overall trust penalty value for the combination of the attributes. In examples, some attributes may be weighted differently from other attributes.

Security access level determining engine 204 utilizes the calculated trust penalty value for the user to determining an appropriate security access level for the user. In examples, security access level determining engine 204 compares the calculated trust penalty value for the user with a predefined trust threshold. If the trust penalty value for the user is greater than the trust threshold, then the user's security access level may be increased in strictness. That is, a stricter security access level may be imposed on the user such that the user's access to certain data, applications, etc., is reduced or restricted. Such restrictions may include reducing the amount of data the user may access and download applications and information (e.g., the user may be limited to downloading 10 files from a certain data repository), limiting the time the user may access and download applications and information (e.g., the user may be limited to accessing and downloading applications and information during normal working hours), and the like.

In other examples, if the trust penalty value for the user is not greater than the predefined trust threshold, the user's security level may remain the same. In additional examples, if the trust penalty value for the user is less than the predefined trust threshold, the user's security level may decrease in strictness. For example, if the user's trust penalty value decreases over time, the user's security level may also decrease in strictness.

Security access level application engine 206 applies the determined security access level to the user. For example, if security access level determining engine 204 determines to increase the strictness of the user's security access level, security access level application engine 206 applies the stricter security access level to the user. Conversely, if security access level determining engine 204 determines not to increase the strictness of the user's security access level, security access level application engine 206 retains the same security access level for the user and/or applies a less strict security access level to the user, if appropriate.

The security access level may be used to impose a security restriction on the user. For example, a security restriction may include limiting the time the user may access the enterprise, denying access to certain sensitive data, limiting an amount of data the user may access, and the like, as well as suitable combinations thereof. In additional examples, the security restriction may also include granting full security access to the user if warranted based on the user's trust penalty value.

Figure 3:
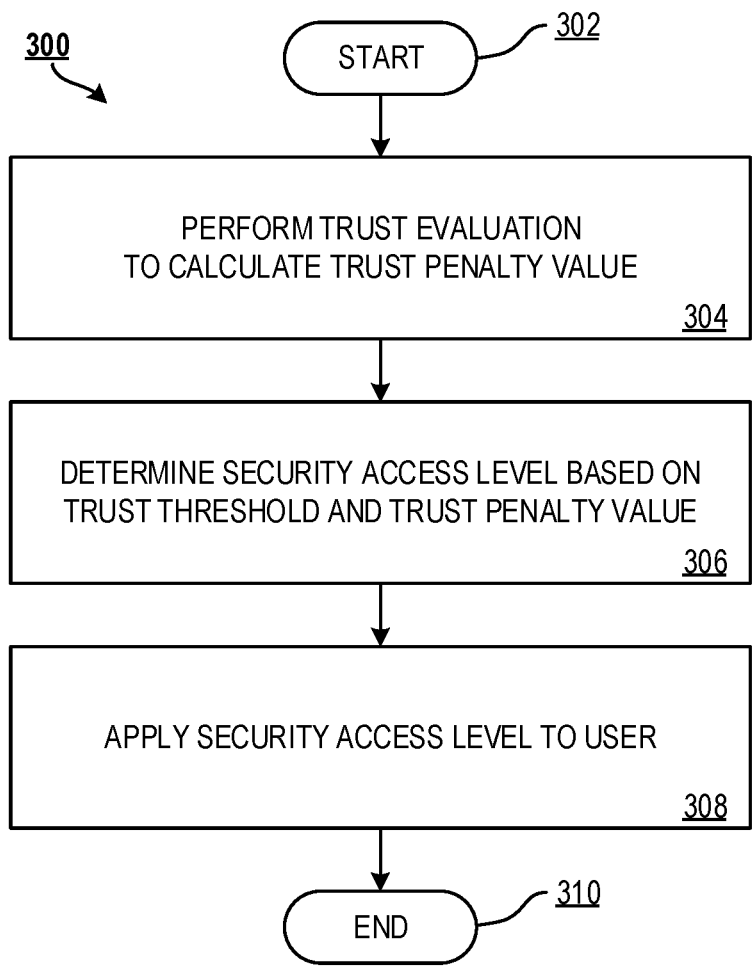
FIG. 3 illustrates a flow diagram of a method for determining a user's security access level based on the user's behavior according to examples of the present disclosure.

In particular, FIG. 3 illustrates a flow diagram of a method 300 for determining a user's security access level based on the user's behavior according to examples of the present disclosure. The method 300 starts at block 302 and continues to block 304.

At block 304, the method 300 comprises performing a trust evaluation to calculate a trust penalty value. The trust penalty value is calculated based on a plurality of measured user attributes (e.g., a social behavior of the user, a life event of the user, a connection attribute of the user, a work activity of the user, etc.), which may be observed. In examples, the trust penalty value, as discussed above, may be a combination of individual trust penalty values for individual measured user attributes.

At block 306, the method 300 comprises determining a security access level based on a trust threshold and the calculated trust penalty value. The trust threshold may be set during an initial setup (illustrated in FIG. 4 and discussed below). In examples, the user's security access level increases in strictness when the trust penalty value for the user is greater than the predefined trust threshold. In other examples, the user's security access level remains the same strictness when the trust penalty value for the user is not greater than the predefined trust threshold. In further examples, the user's security access level decreases in strictness when the trust penalty value for the user is less than the predefined trust threshold.

At block 308, the method 300 comprises applying the security access level to the user. For example, if it is determined that the user should be subjected to a stricter security access level, the stricter security access level is applied. If it is determined that the user should be subjected to a less strict security access level, the less strict security access level is applied. Appling the security access level may also include maintaining a previously applied security access level (for example, if it is determined that the security access level should remain the same). The method continues to block 310 and ends.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
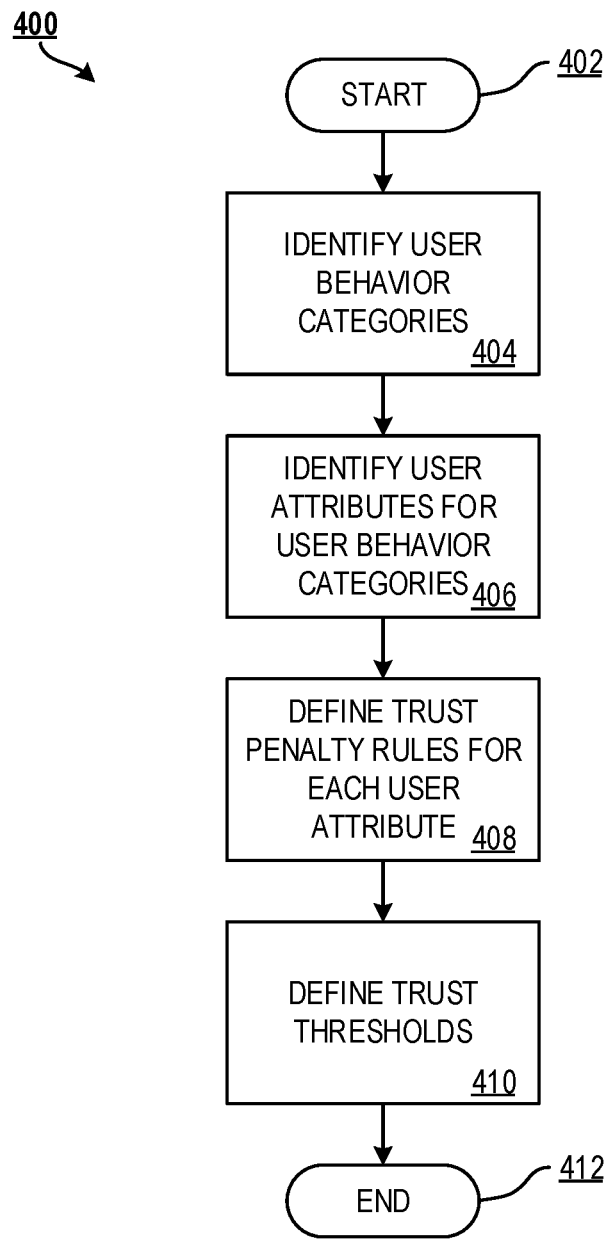
FIG. 4 illustrates a flow diagram of a method for determining a user's security access level based on the user's behavior according to examples of the present disclosure.

In particular, FIG. 4 illustrates a flow diagram of a method 400 for determining a user's security access level based on the user's behavior according to examples of the present disclosure. In particular, the method 400 is a setup routine that enables parameters for determining a user's security access level to be established. The method 400 starts at block 402 and continues to block 404.

At block 404, the method 400 comprises identifying user behavior categories. Examples of user behavior categories may include a social behavior of the user, a life event of the user, a connection attribute of the user, a compliance issue of the user, and a work activity of the user.

At block 406, the method 400 comprises identifying user attributes for the user behavior categories. Each of the behavior categories identified at block 404 may have attributes associated therewith. For example and as discussed above, for a behavior category of a life event of the user, user attributes for the life event behavior category may include whether the user is recently married or divorced, whether the user had a new child, whether the user is a new employee, is on probation, or is close to retirement, whether the user's credit score changed, and whether the user has engaged in any known criminal activity. Similarly, for a behavior category of a compliance issue for a user, user attributes for the compliance issue may include prior failed audits of the user's device or whether the user's device contains a virus or malicious code. Each of the behavior categories may have a variety of different user attributes as discussed herein.

At block 408, the method 400 comprises defining trust penalty rules for each attribute for the user behavior categories. For example, the following rules may be set for the compliance user behavior category. If a user is non-compliant, the trust penalty value may be set to 2. If the user was non-compliant more than once in the past six months, the trust penalty value may be set to 4. If the user is non-compliant for high severity issues (e.g., the user's device contains malicious code, the user downloaded data from an unapproved site, the user's device was part of a system breach, etc.), the trust penalty value may be set to 6. If the user is compliant, the trust penalty value may be set to 0. In other examples, other rules and other values may be set as desired.

At block 410, the method 400 comprises defining trust thresholds. Continuing with the example of non-compliance, thresholds may be set to a value of 4. For an example threshold of 4 for non-compliance, the following security access levels may be applied. If the trust penalty value is less than the threshold (i.e., is less than 4), the user may be granted access to a resource. If the trust penalty value is equal to the threshold (i.e., is equal to 4), the user may be granted access to the resource, but the user may be monitored while using the resource. If the trust penalty value is greater than the threshold (i.e., is greater than 4), the user may have limited or no access to the resource. In examples, the threshold may be a range. Other suitable thresholds and corresponding security access levels may be defined as appropriate. The method 400 continues to block 412 and ends.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
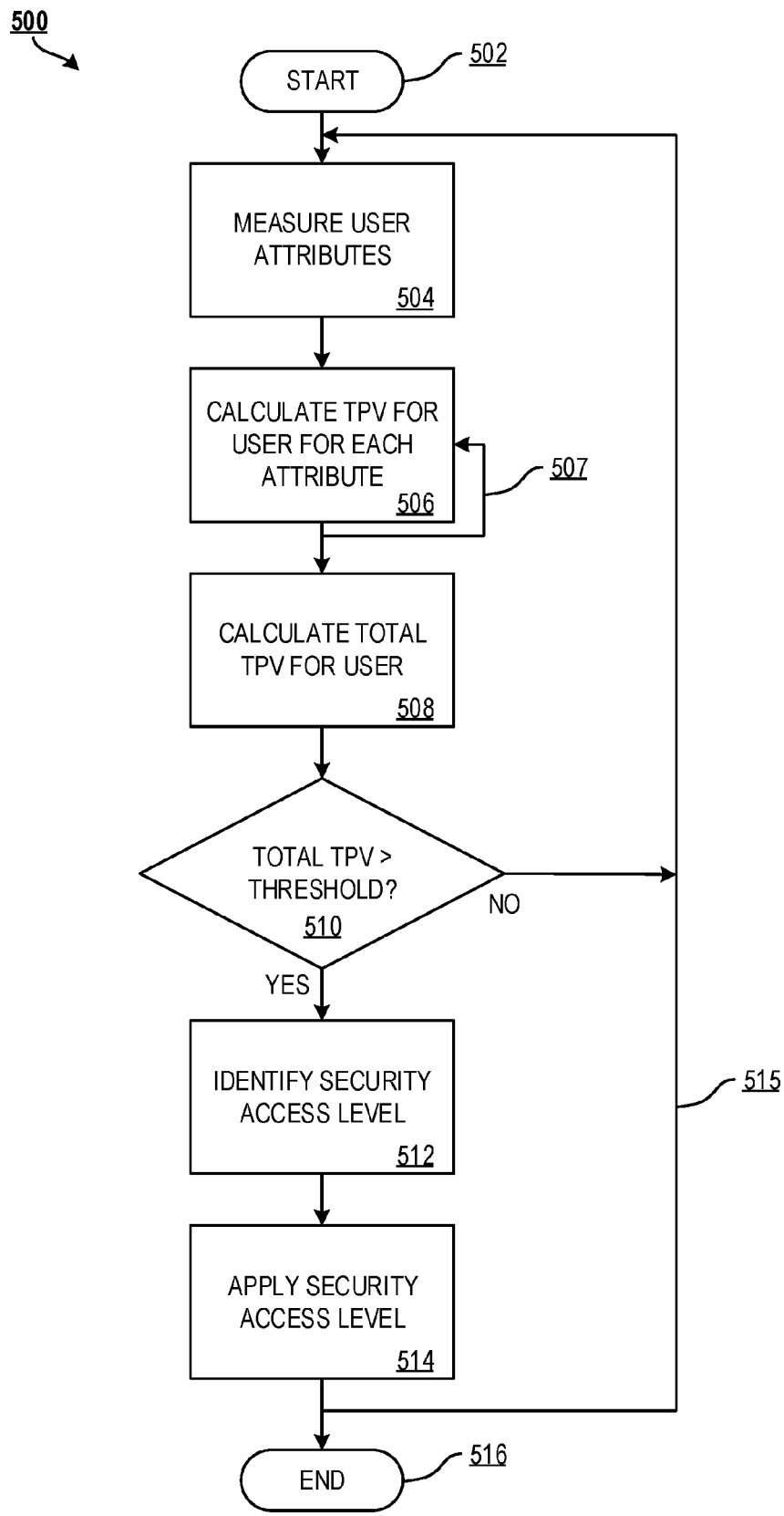
FIG. 5 illustrates a flow diagram of a method for determining a user's security access level based on the user's behavior according to examples of the present disclosure.

In particular, FIG. 5 illustrates a flow diagram of a method 500 for determining a user's security access level based on the user's behavior according to examples of the present disclosure. In particular, the method 500 is an iterative flow routine to monitor a user's behavior and adjust the user's security access level accordingly based on the setup routine of FIG. 4. The method 500 starts at block 502 and continues to block 504.

At block 504, the method 500 includes measuring the user attributes identified at block 406 of FIG. 4. The user's behaviors, including at least the user's social behavior, life events, connection attributes, compliance issues, and/or work activities, and associated attributes are measured. For the compliance example of FIG. 4, prior failed audits of the user's device and/or whether the user's device contains a virus or malicious code are measured for example.

At block 506, the method 500 includes calculating a trust penalty value for each of the measured attributes as illustrated by arrow 507. For example, a trust penalty value for prior failed audits is calculated, and a separate trust penalty value for whether the user's device contains a virus or malicious code is calculated.

At block 508, the method 500 includes calculating a total trust penalty value for the user from each of the trust penalty values for each individual attribute. In examples, certain of the trust penalty values may be weighted more heavily than other trust penalty values to calculate the total trust penalty value.

At block 510, the method 500 comprises comparing the total trust penalty value to the threshold defined in the setup routine of FIG. 4. If the total trust penalty value is not greater than the defined threshold, the method 500 returns to the start 502 and continue to measure the user attributes at block 504.

However, if the totally trust penalty value is greater than the defined threshold, the method 500, at block 512, identifies the proper security access level based on the total trust penalty value and the defined threshold.

At block 514, the method 500 then applies the appropriate security access level to the user. As illustrated by arrow 515, the method 500 may return to the start 502 and continue to measure the user attributes at block 504. In other examples, the method 500 continues to block 516 and ends.

Additional processes also may be included, and it should be understood that the processes depicted in FIG. 5 represent illustrations, and that other processes may be added or existing processes may be removed, modified, or rearranged without departing from the scope and spirit of the present disclosure.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    performing a trust evaluation to calculate a total trust penalty value for a user, wherein the total trust penalty value is calculated based on a plurality of individual trust penalty values that are calculated for each of a plurality of measured user attributes, wherein the plurality of measured user attributes are based on observing a behavior of the user;
    determining, by a processing device, whether the total trust penalty value is greater than a predefined threshold;
    responsive to determining that the total trust penalty value is greater than the predefined threshold, determining, by the processing device, a security access level; and
    applying the security access level to the user by imposing a security restriction on the user based at least in part on the security access level of the user, wherein the security access level of the user increases in strictness when the total trust penalty value for the user is greater than the predefined trust threshold, wherein the security access level of the user remains the same strictness when the total trust penalty value for the user is not greater than the predefined trust threshold, and wherein the security access level of the user decreases in strictness when the total trust penalty value for the user is less than the predefined trust threshold.

2. The computer-implemented method of claim 1, wherein the security access level imposes a restriction on at least one of an allowable user action and an allowable system action.

3. The computer-implemented method of claim 1, further comprising:
    defining the predefined trust threshold during an initial setup.

4. A system comprising:
    a processor in communication with one or more types of memory, the processor configured to:
        perform a trust evaluation to calculate a total trust penalty value for a user, wherein the total trust penalty value is calculated based on a plurality of individual trust penalty values that are calculated for each of a plurality of measured user attributes, wherein the plurality of measured user attributes are based on observing a behavior of the user,
        determine whether the total trust penalty value is greater than a predefined threshold;
        responsive to determining that the total trust penalty value is greater than the predefined threshold, determine a security access level, and
        apply the security access level to the user by imposing a security restriction on the user based at least in part on the security access level of the user, wherein the security access level of the user increases in strictness when the total trust penalty value for the user is greater than the predefined trust threshold, wherein the security access level of the user remains the same strictness when the total trust penalty value for the user is not greater than the predefined trust threshold, and wherein the security access level of the user decreases in strictness when the total trust penalty value for the user is less than the predefined trust threshold.

5. The system of claim 4, wherein the security access level imposes a restriction on at least one of an allowable user action and an allowable system action.

6. The system of claim 4, wherein the processor is further configured to:
define the predefined trust threshold during an initial setup.

7. A computer program product comprising:
a non-transitory storage medium readable by a processing circuit and storing instructions for execution by the processing circuit for performing a method comprising:
performing a trust evaluation to calculate a total trust penalty value for a user, wherein the total trust penalty value is calculated based on a plurality of individual trust penalty values that are calculated for each of a plurality of measured user attributes, wherein the plurality of measured user attributes are based on observing a behavior of the user,
determining whether the total trust penalty value is greater than a predefined threshold;
responsive to determining that the total trust penalty value is greater than the predefined threshold, determining a security access level, and
applying the security access level to the user by imposing a security restriction on the user based at least in part on the security access level of the user, wherein the security access level of the user increases in strictness when the total trust penalty value for the user is greater than the predefined trust threshold, wherein the security access level of the user remains the same strictness when the total trust penalty value for the user is not greater than the predefined trust threshold, and wherein the security access level of the user decreases in strictness when the total trust penalty value for the user is less than the predefined trust threshold.

* * * * *